(12) United States Patent
Lundgren

(10) Patent No.: US 6,945,032 B2
(45) Date of Patent: Sep. 20, 2005

(54) METHOD FOR MANUFACTURING OUTLET NOZZLES FOR ROCKET ENGINES

(75) Inventor: Jan Lundgren, Grundsund (SE)

(73) Assignee: Volvo Aero Corporation (SE)

( * ) Notice: Subject to any disclaimer, the term of this patent is extended or adjusted under 35 U.S.C. 154(b) by 0 days.

(21) Appl. No.: 10/872,667

(22) Filed: Jun. 21, 2004

(65) Prior Publication Data

US 2004/0237533 A1 Dec. 2, 2004

Related U.S. Application Data

(62) Division of application No. 10/370,536, filed on Feb. 20, 2003, which is a division of application No. 09/806,607, filed as application No. PCT/SE99/01727 on Sep. 29, 1999, now Pat. No. 6,591,499.

(30) Foreign Application Priority Data

Oct. 2, 1998 (SE) ............................................. 9803387

(51) Int. Cl.[7] ................................................. F02K 9/72
(52) U.S. Cl. ..................................... 60/260; 29/890.01
(58) Field of Search ......................... 60/257, 260, 770; 29/890.01

(56) References Cited

U.S. PATENT DOCUMENTS

| | | | |
|---|---|---|---|
| 3,235,947 A | 2/1966 | Sohlemann | |
| 3,595,025 A | * 7/1971 | Stockel et al. | ................ 60/267 |
| 3,832,290 A | 8/1974 | Fortini | |
| 5,221,045 A | 6/1993 | McAninch et al. | |
| 5,233,755 A | 8/1993 | Vandendriessche | |
| 5,501,011 A | 3/1996 | Pellet | |
| 5,588,268 A | 12/1996 | Sterflinger et al. | |
| 5,645,127 A | 7/1997 | Enderle et al. | |
| 5,822,853 A | 10/1998 | Ritter et al. | |
| 5,874,015 A | 2/1999 | Mittendorf et al. | |
| 6,107,596 A | 8/2000 | Semenov et al. | |
| 6,134,782 A | 10/2000 | Wright | |
| 6,205,661 B1 | 3/2001 | Ring | |
| 6,240,640 B1 | 6/2001 | Matsuoka et al. | |
| 6,783,824 B2 * | 8/2004 | Steffier | ..................... 428/34.4 |
| 6,789,316 B2 * | 9/2004 | Häggander et al. | ...... 29/890.01 |
| 2004/0103638 A1 * | 6/2004 | Haggander et al. | ........... 60/267 |
| 2004/0103639 A1 * | 6/2004 | Haggander | .................. 60/267 |
| 2004/0103640 A1 * | 6/2004 | Haggander | .................. 60/267 |
| 2005/0086928 A1 * | 4/2005 | Haggander | .................. 60/257 |

* cited by examiner

Primary Examiner—Ehud Gartenberg
(74) Attorney, Agent, or Firm—Lerner, David, Littenberg, Krumholz & Mentlik, LLP

(57) ABSTRACT

A wall structure capable of withstanding high thermal load, including a wall structure with an inner wall, an outer wall positioned about the inner wall, and distancing elements located between the inner and outer walls. The distancing elements are joined to at least one of the inner and outer walls by means of laser welding and thereby establishing a plurality of cooling ducts between the inner and outer walls and a weld joint formed by the laser welding and having a cross-section taken through the wall structure that is substantially T-shaped and which displays a rounded shape towards an inside one of the plurality of cooling ducts.

5 Claims, 4 Drawing Sheets

METHOD FOR MANUFACTURING OUTLET NOZZLES FOR ROCKET ENGINES

CROSS REFERENCE TO RELATED APPLICATIONS

The present application is a divisional of U.S. application Ser. No. 10/370,536 filed Feb. 20, 2003, which claims the benefit of U.S. application Ser. No. 09/806,607, filed on Apr. 2, 2001 now U.S. Pat. No. 6,591,499, the disclosures of which are incorporated by reference herein.

FIELD OF THE INVENTION

The present invention relates to a method for manufacturing outlet nozzles for rocket motors. More particularly, the present invention is intended for use in respect of cooled outlet nozzles for rocket motors driven by liquid fuel.

BACKGROUND OF THE INVENTION

The term rocket is the collective name given to those craft which include a drive source in the form of a rocket motor. Rockets are currently used, inter alia, for space-flights and for research and communications purposes. Rocket motors are also used in other contexts, for example in apparatus for aiding the take-off of aircraft and for ejecting the pilot from an aircraft in emergency situations.

In a rocket motor, the energy for propulsion of the rocket is generated in a combustion chamber through the burning of a fuel, for example in the form of liquid hydrogen. This fuel is fed together with an oxidizer (for example in the form of liquid oxygen) by means of valves to the combustion chamber. As the fuel burns, combustion gases are generated in the combustion chamber. These combustion gases flow rearwardly out from the combustion chamber, and then out through an outlet nozzle, whereupon a reaction force is generated such that the rocket is propelled forwards. The outlet nozzle is configured to allow for expansion and acceleration of the combustion gases to a high velocity such that the necessary thrust is attained for the rocket. The fact that a rocket motor can generate very large drive forces and can additionally operate independently of the surrounding medium makes it especially suitable as a means of transport for space-flights.

While a rocket motor is running, the outlet nozzle is subjected to very high stresses, for example in the form of a very high temperature on its inside (in the order of magnitude of 800 K) and a very low temperature on its outside (in the order of magnitude of 50 K). As a result of this high thermal load, stringent requirements are placed upon the choice of material, design and manufacture of the outlet nozzle. One of these requirements is a need for effective cooling of the outlet nozzle.

In order to achieve optimal cooling, the outlet nozzles according to the prior art are configured with a number of cooling ducts which are arranged in parallel within the actual nozzle wall, and which extend between the inlet end and the outlet end of the outlet nozzle. The manufacture of the outlet nozzle, that is to say the configuration of its wall such that the necessary cooling ducts are formed, can be carried out using a host of different methods.

In this context, it is also the case that high efficiency can be obtained in a rocket if the cooling medium is also used as fuel. For this reason, there is often a desire to re-use all of the cooling medium for burning in the combustion chamber.

A previously known method of manufacturing a cooled outlet nozzle is by configuring the nozzle wall from a large number of round or oval pipes made, for example, from nickel-based steel or stainless steel, which pipes are arranged close together and are subsequently joined together along their sides. This joining can in this case be realized by means of soldering, which is however a manufacturing method which is relatively costly. Moreover, the soldering results in an increase in the weight of the outlet nozzle. The soldering additionally represents a complicated and time-consuming operation in which it is difficult to attain the necessary strength and reliability in the completed wall structure.

Another significant drawback with solder-based joining is that it is complicated and expensive to check the solder joints. If, for example, a fault occurs along a solder joint, it is very difficult to repair the joint since this damage is not normally accessible. Furthermore, the soldering structure is relatively weak in the tangential direction, which in certain cases can create the need for a strengthening structure in the form of a jacket. This is especially so in those instances in which the flame pressure during the combustion in the rocket motor is very high, or in which high lateral forces are present.

A manufacturing technique which uses soldering can further place a limit upon the maximum temperature at which the outlet nozzle can be used.

An alternative method of manufacturing a cooled outlet nozzle is by diffusion-welding of round or rectangular pipes which are arranged in parallel. Even though this method has advantages over the soldering method, it is still relatively expensive.

According to a further manufacturing method, rectangular pipes of constant cross section made from nickel-based steel or stainless steel are used, which pipes are arranged parallel with one another and are welded together. These pipes are spirally wound such that they form an angle with the geometrical axis of the nozzle, which angle increases progressively from the inlet end of the nozzle to its outlet end, to thus form a bell-shaped nozzle wall. The abovementioned joining method has the drawback that those types of rectangular pipes which are commercially available for use with this method are normally made with a constant wall thickness. This means that the wall structure of the outlet nozzle cannot be configured for an optimal cooling capacity, since the walls between two mutually adjacent cooling ducts are unnecessarily thick. Moreover, the spiral winding means that the cooling ducts are long and hence give rise to an increased fall in pressure, which for certain running states of the rocket motor is undesirable.

A further method for manufacturing a combustion chamber for rocket motors is described in U.S. Pat. No. 5,233,755. According to this method, a corrugated structure is used to form an inner wall, which is joined together with an outer wall by, for example, soldering, diffusion-welding or laser-welding. Cooling ducts are thereby formed, through which a cooling medium can be conducted.

A drawback with the method according to U.S. Pat. No. 5,233,755 is that, owing to the configuration of the corrugated inner wall, "pockets" are formed at its points of contact against the outer wall. In these portions, a limited flow of the cooling medium is therefore obtained, resulting in locally reduced cooling of the wall structure. This gives rise, in turn, to a risk of overheating of the wall structure. There is also a risk of dirt, for example in the form of small particles, accumulating in these pockets. This dirt may subsequently be released from the cooling ducts, which is also a drawback, especially if the cooling medium is also to be used as fuel in the rocket motor.

A further drawback with the manufacturing method according to U.S. Pat. No. 5,233,755 is that the corrugations in the inner wall lead to a limited part of the cooling medium being permitted to have contact with the inner, warm nozzle wall. This too adversely affects the cooling process. Furthermore, the corrugated structure is subjected to bending forces owing to the pressure of the cooling medium inside the structure. Together with the sharp notch at the respective welding joint, these bending forces lead to very high stresses upon the wall structure. This type of structure therefore has limits in terms of its pressure capacity and working life.

The corrugated shape of the distancing material, compared with straight, radially directed distancing elements, leads moreover to increased weight and increased flow resistance.

One object of the present invention is to make available an improved method for manufacturing a cooled outlet nozzle for a rocket motor.

SUMMARY OF THE INVENTION

In accordance with the present invention, this and other objects have now been realized by the invention of a method of manufacturing an outlet nozzle for use in rocket motors comprising providing an inner wall, positioning an outer wall around the inner wall to provide a space therebetween, positioning a plurality of spacers in the space between the inner and outer walls, and laser welding between the plurality of spacers and at least one of the inner and outer walls, whereby a plurality of cooling ducts are formed between the plurality of spacers, the laser welding providing T-shaped weld joints between the plurality of spacer and the at least one of the inner and outer walls, the T-shaped weld joints including a rounded shape within the plurality of cooling ducts. In a preferred embodiment, the outlet nozzle includes an inlet end and an outlet end, and the plurality of spacers extends substantially from the inlet end to the outlet end to thereby provide the plurality of cooling ducts substantially from the inlet end to the outlet end.

In accordance with one embodiment of the method of the present invention, the laser welding comprises providing the T-shaped weld joints between the plurality of spacers and both the inner and outer walls.

In accordance with another embodiment of the method of the present invention, the plurality of spacers are integral with the inner wall. Preferably, the method includes milling the inner wall to provide the plurality of spacers integral therewith.

In accordance with another embodiment of the method of the present invention, the plurality of spacers are substantially at right angles to both the inner and outer walls.

In accordance with another embodiment of the method of the present invention, the outer wall and the plurality of spacers have a thickness of between 0.4 and 1.5 mm.

In accordance with another embodiment of the method of the present invention, the T-shaped weld joints have the rounded shape having a radius of between 0.4 and 1.5 mm.

The present invention relates more precisely to a method for manufacturing an outlet nozzle in rocket motors, which outlet nozzle is configured with a wall structure which comprises a plurality of mutually adjacent cooling ducts extending substantially from the inlet end of the outlet nozzle to its outlet end, which method comprises positioning an outer wall around an inner wall, configuring and positioning a plurality of distancing elements between the outer wall and the inner wall, and joining the distancing elements between the inner wall and the outer wall, whereupon the cooling ducts are formed. The invention includes joining by means of laser-welding and is designed for the configuration of weld joints which, in a cross section through the wall structure, are substantially T-shaped and have a shape which is rounded towards the inside of the cooling ducts.

As a result of the present invention, a host of advantages are obtained. Firstly, a manufacturing method for an outlet nozzle is provided, which can be executed at low cost. Moreover, as a result of the specific geometry in the weld joints, a wall structure is obtained having good nozzle-cooling properties. Moreover, the rounded shape of the weld joints produces an even flow in which there is very little risk of an accumulation of particles.

A further advantage with the present invention is that the distancing elements, as a result of their flat configuration in the radial direction in relation to an imaginary axis of symmetry through the outlet nozzle, are not subjected to any bending forces. In addition, a very low concentration of stresses in the weld joints is obtained, owing to the configuration of the radii between the integral components.

The present invention further provides for low material consumption, low weight, low costs, high reliability and good thermal cooling capacity of the complete wall structure. Moreover, the geometry of the wall structure can be easily adapted to the cooling requirements which pertain to the particular application.

BRIEF DESCRIPTION OF THE DRAWINGS

The present invention is to be explained in further detail below with reference to the detailed description, which, in turn, refers to the appended figures, in which.

DETAILED DESCRIPTION

Figure 1:
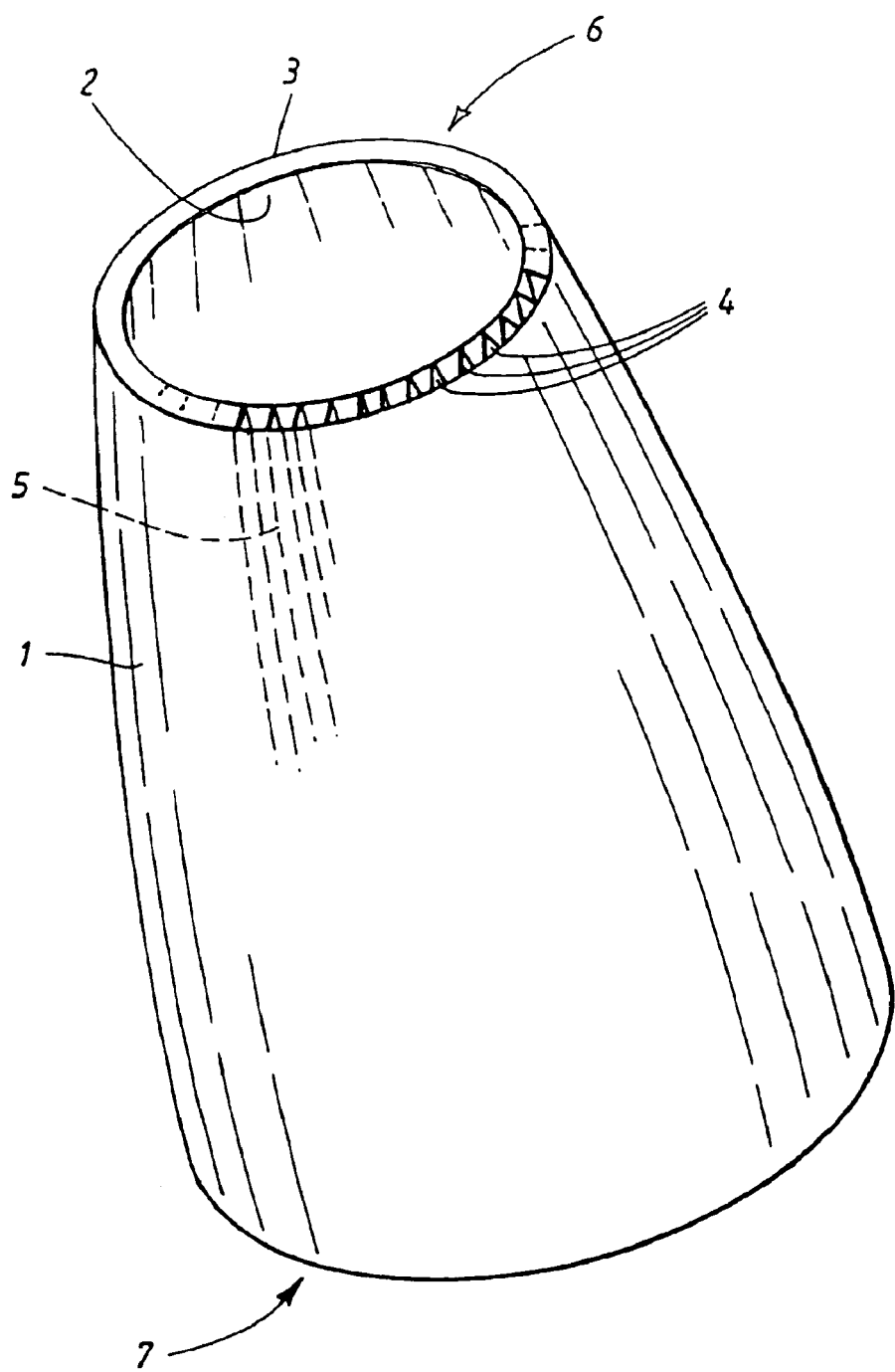
FIG. 1 is a side, perspective view showing an outlet nozzle according to the present invention.

FIG. 1 shows a diagrammatic and somewhat simplified perspective view of an outlet nozzle 1 which is produced according to the present invention. According to a preferred embodiment, the outlet nozzle 1 is of the type which is used in rocket motors for conducting the combustion gases out of a combustion chamber (not shown) belonging to the rocket motor. The present invention is preferably intended for use in rocket motors of the type which are driven with a liquid fuel, for example liquid hydrogen. The method by which such rocket motors operate is known per se, and is therefore not described in detail here.

The outlet nozzle 1 is of the type which is cooled with the aid of a cooling medium, which is preferably also used as motor fuel in the particular rocket motor. The present invention is not, however, limited to outlet nozzles of this type, but can also be used in those cases in which the cooling medium is dumped after it has been used for cooling.

The outlet nozzle 1 is manufactured with an outer shape which conforms in general with those of the prior art, that is to say substantially bell-shaped. Furthermore, the outlet nozzle 1 according to the present invention is made up of two walls, more precisely an inner wall 2 and an outer wall 3, which encloses the inner wall 2. The inner wall 2 and the outer wall 3 are separated by special distancing elements or spacers 4. These distancing elements 4 are configured according to a first embodiment of the present invention such that a number of longitudinal grooves are first configured, preferably by milling, in the inner wall 2. The distancing elements 4 are thereby formed as a number of protruding elements 4 extending substantially at right-angles out from the inner wall 2 and to the outer wall 3, that is to say in the radial direction in relation to an imaginary axis of symmetry through the outlet nozzle 1.

According to the following description, the method according to the present invention is based upon the distancing elements 4 being joined together by laser-welding. According to one embodiment, the distancing elements 4 are joined together against the outer wall 3. A number of cooling ducts 5 are thereby formed, extending substantially in parallel in the longitudinal direction of the outlet nozzle 1 from the inlet end 6 of the outlet nozzle 1 to its outlet end 7. In FIG. 1 such a cooling duct 5 is illustrated by dashed lines, which indicate the distancing elements which constitute the limits of the cooling duct 5 in the lateral direction.

The materials which are used for the inner wall 2, the outer wall 3 and the distancing elements 4 constitute weldable materials, preferably stainless steel of the type 347 or A286. Alternatively, nickel-based alloys can be used. Examples of such materials are INCO600, INCO625 and Hastaloy x. According to further variants, cobalt-based alloys of the type HAYNES 188 and HAYNES 230 can also be used in the present invention.

Figure 2:
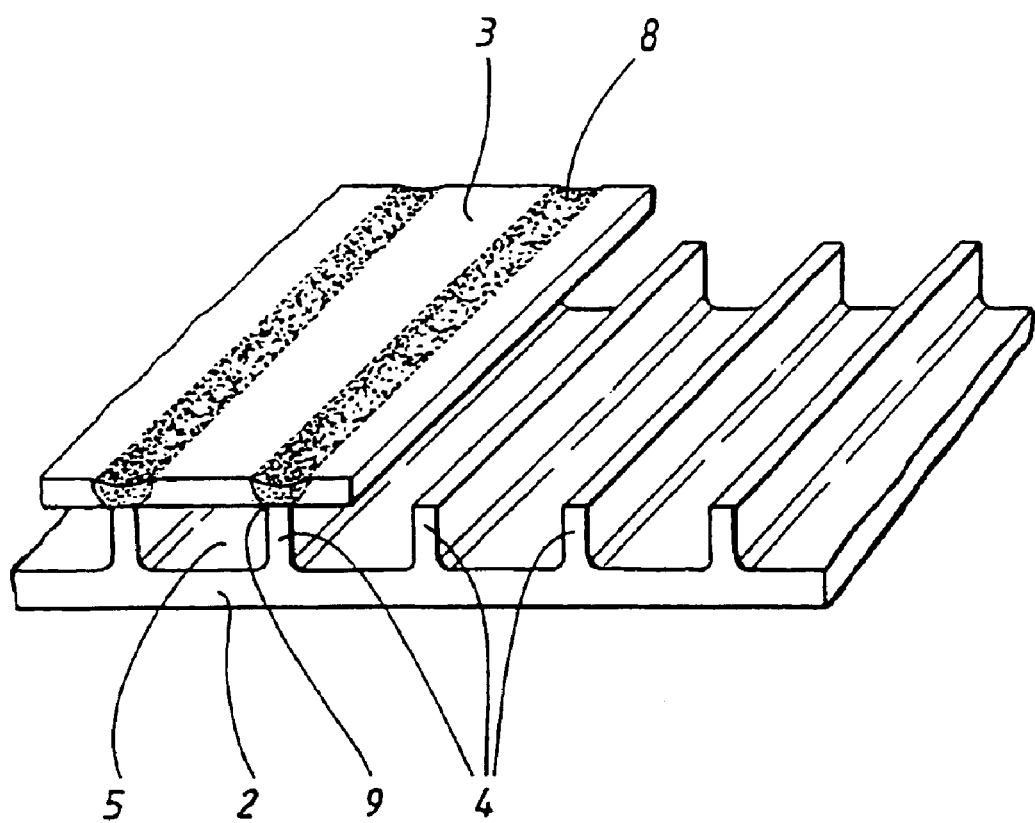
FIG. 2 is a side, partial, perspective view showing in detail how the outlet nozzle can be manufactured according to one embodiment of the present invention.

FIG. 2 is a perspective view of a portion of the wall structure of the outlet nozzle 1, which wall structure substantially constitutes an inner wall 2, an outer wall 3 and a number of distancing elements 4, which are configured as protruding elements by milling of the inner wall 2. According to the present invention, the wall structure is joined together by means of laser-welding of the distancing elements 4 against the outer wall 3, whereupon a number of substantially parallel and somewhat recessed grooves 8 appear on the outside of the outer wall 3. Moreover, the abovementioned, substantially parallel cooling ducts 5 are in this case formed, through which a suitable cooling medium is intended to flow during running of the particular rocket motor.

In the laser-welding, a Nd:YAG laser is preferably used, but other types of welding apparatus, for example a $CO_2$ laser, can also be used according to the present invention.

It can be seen from FIG. 2 that a weld joint 9 is formed along each section in which the respective distancing element 4 is joined together with the outer wall 3. As the result of precise coordination of the welding method and the dimensions of the components making up the wall structure, a substantially T-shaped and softly rounded shape is obtained in the respective weld joint 9 on the inside of the respective cooling duct 5, which in turn yields a number of advantageous properties of the completed outlet nozzle, for example good cooling properties, high strength and simplicity of manufacture.

Figure 3:
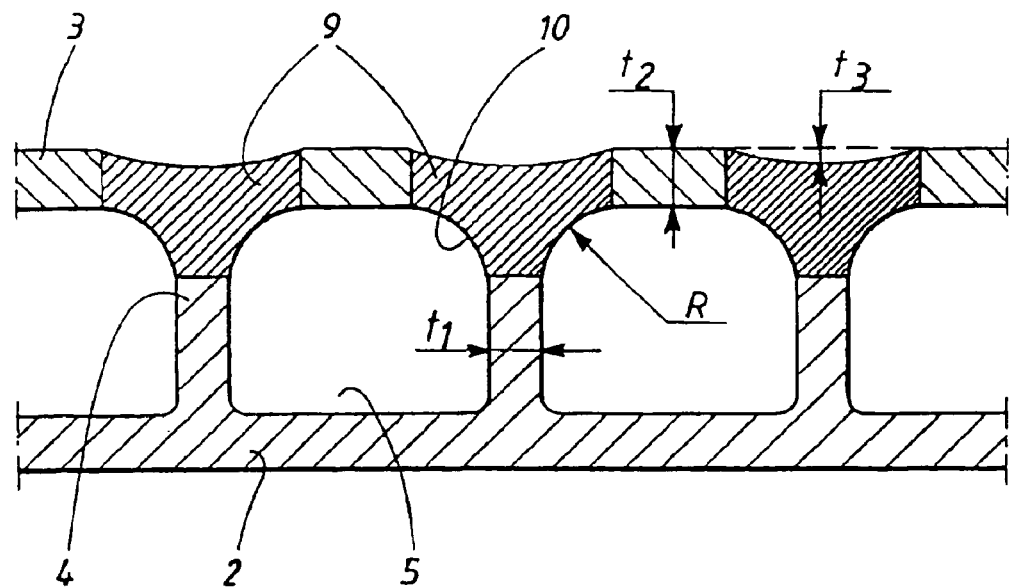
FIG. 3 is a side, elevational, partial, cross-sectional view showing in detail the wall structure of the outlet nozzle after having been joined together according to one embodiment of the present invention.

A cross section through the wall of the outlet nozzle 1, according to the first embodiment, can be seen in detail in FIG. 3. The cross section of the above-described weld joints 9 is illustrated in FIG. 3 by dashed lines.

The present invention is based upon laser-welding being carried out such that the outer wall 3 is joined together with the respective distancing element 4. It is assumed that the distancing element 4 has a predetermined thickness $t_1$, which according to this embodiment is on the order of magnitude of 0.4 to 1.5 mm. The outer wall 3 further has a predetermined thickness $t_2$, which is also on the order of magnitude of 0.4 to 1.5 mm. Through precise coordination of, inter alia, the dimensions of the two walls, 2 and 3, and the distancing elements 4, according to the present invention a weld joint 9 is obtained having the abovementioned T-shape, in which a soft rounding 10 of the inner wall in the respective cooling duct 5 is obtained. Through laser-welding, a radius R of this rounded seam 10 on the order of magnitude of $t_{1min}<R<t_{1max}$ is obtained, which with the above-stated dimensions corresponds to a radius R within the range 0.4 to 1.5 mm. A depth $t_3$ of the joint in relation to the top side of the outer wall 3 is further obtained. This depth $t_3$ is maximally on the order of magnitude of $0.3 \times t_2$, which corresponds to the range 0.12 to 0.45 mm.

Figure 4:
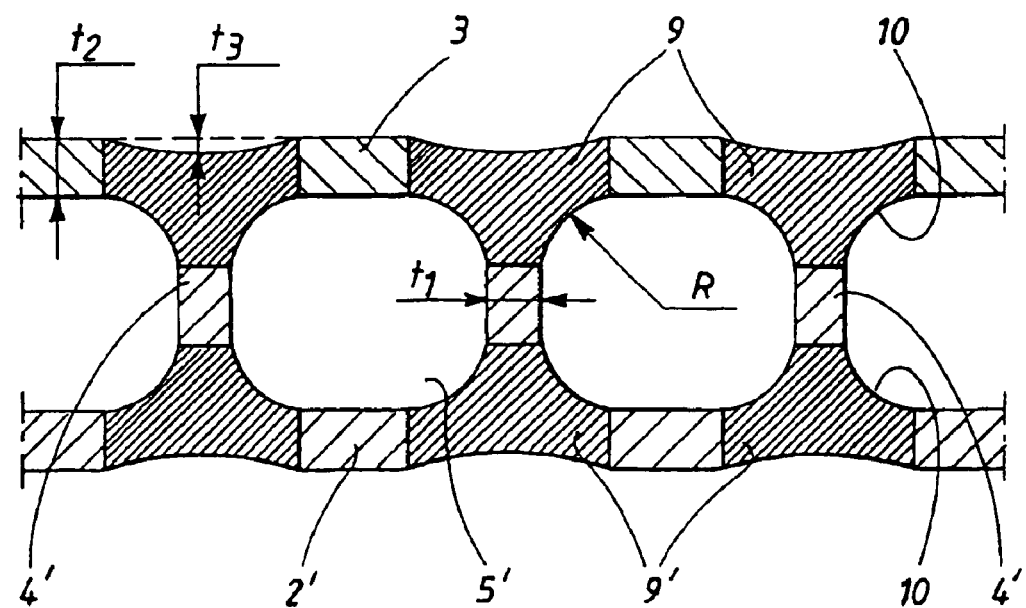
FIG. 4 is a side, elevational, partial, cross-sectional view showing in detail the wall structure of the outlet nozzle after having been joined together according to another embodiment of the present invention.

In FIG. 4 it is shown how an outlet nozzle can be manufactured by use of a second embodiment of the present invention, according to which an inner wall 2' and an outer wall 3 are used. The outer wall 3 is of the same type as in the abovementioned embodiment, but the inner wall 2' is not configured with any milled-out ducts or the equivalent. In this second embodiment, a number of separate distancing elements 4' are instead used, which are fixed to the inner wall 2' prior to execution of the laser-welding operation. These distancing elements 4' are thereby used as demarcation of a number of cooling ducts 5', through which the particular cooling medium can flow.

According to this second embodiment, the laser-welding is carried out on both the outside and the inside of the wall structure. A number of weld joints, 9 and 9', are thereby obtained, extending on both sides of the completed wall structure. As in FIG. 3, these weld joints, 9 and 9', are illustrated in FIG. 4 by dashed lines. The weld joints, 9 and 9', have the same substantially T-shaped cross section as in the abovementioned first embodiment.

The advantage with the second embodiment is that no milling is required of the inner wall 2', thereby affording time and material savings. In this embodiment, the distancing elements 4' must instead be fixed in a suitable manner between the inner wall 2' and the outer wall 3, after which welding is realized on both sides of the wall structure.

Figure 5:
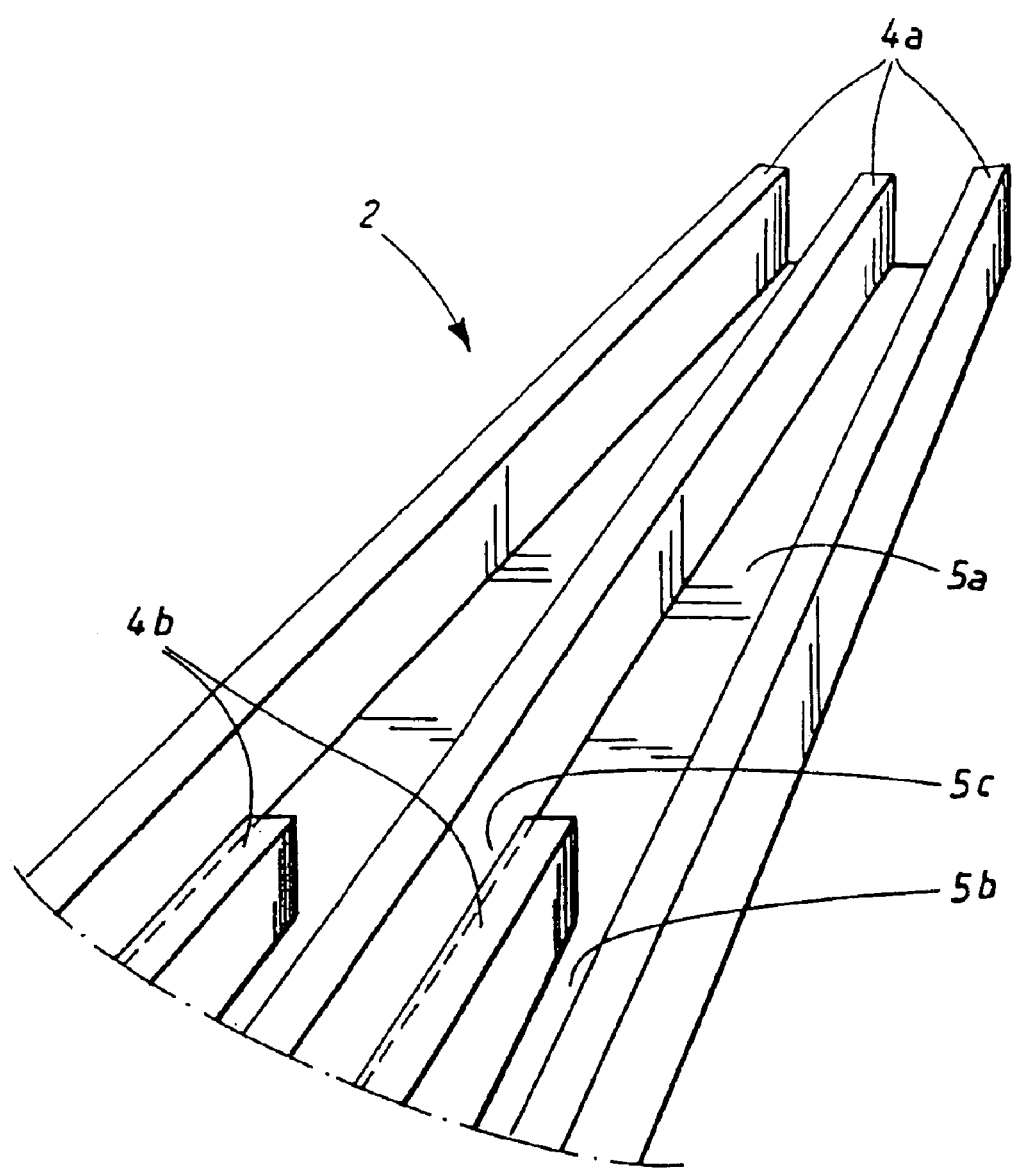
FIG. 5 is a top, perspective, partial view of a number of cooling ducts arranged in an outlet nozzle manufactured according to the present invention.

In FIG. 5, a portion of an outlet nozzle 1 according to the present invention is shown, more precisely a portion of the inner wall 2 with associated distancing elements. Where this structure has been manufactured according to the abovementioned first embodiment, these distancing elements are configured by milling. According to FIG. 5, the distancing elements are divided into a first set of distancing elements 4a and a second set of distancing elements 4b, in which the second set is positioned somewhat displaced in the longitudinal direction of the outlet nozzle. This produces a distribution and control of the cooling medium flow in a first cooling duct 5a, which is divided into a second cooling duct 5b and a third cooling duct 5c.

A host of advantages are offered by the present invention. Above all, it can be stated that the method according to the present invention provides very good flexibility in the configuration of an outlet nozzle. For example, the cross-sectional shape of the respective cooling duct 5 can readily be varied by altering parameters such as depth and width in the abovementioned milling of the inner wall 2. The outlet nozzle can thus be easily dimensioned in a manner which is adjusted according to the thermal load upon the outlet nozzle, which load normally varies along the longitudinal direction of the outlet nozzle. This results, in turn, in an increased working life for such an outlet nozzle. Furthermore, no increase in weight is obtained in the various weld joints which are formed between the respective distancing elements 4, the inner wall 2' and the outer wall 3. A further advantage thereof is that any defective weld joint is relatively simple to repair. In addition, very favourable flow ratios of the cooling medium are obtained by virtue of the rounded shape of the weld joints, 9 and 9'.

The present invention is not limited to the illustrative embodiments described above and shown in the drawings, but can be varied within the scope of the following claims. For example, the present invention can be used irrespective of whether the outlet nozzle is round in shape or is configured as a polygon.

What is claimed is:

1. A wall structure capable of withstanding high thermal load, said wall structure comprising:

a wall structure having an inner wall, an outer wall positioned about said inner wall, and distancing elements located between said inner and outer walls;

said distancing elements being joined to at least one of said inner and outer walls by means of laser welding and thereby establishing a plurality of cooling ducts between said inner and outer walls; and a weld joint formed by said laser welding and having a cross-section taken through said wall structure that is substantially T-shaped and which displays a rounded shape towards an inside one of said plurality of cooling ducts.

2. The wall structure according to claim 1, further comprising:

said distancing elements being oriented so as to run substantially at right angles from said inner wall to said outer wall.

3. The wall structure according to claim 1, further comprising:

said outer wall and said distancing elements having a thickness between about 0.4 and 1.5 mm.

4. The wall structure according to claim 1, further comprising:

said weld joint having a radius between about 0.4 and 1.5 mm.

5. The wall structure according to claim 1, further comprising:

said wall structure comprising a portion of an inclusive member adapted to enclose an interior space delimited by said inclusive member.

* * * * *